United States Patent [19]
Katoh et al.

[11] Patent Number: 5,320,409
[45] Date of Patent: Jun. 14, 1994

[54] SEAT APPARATUS FOR VEHICLE

[75] Inventors: Kazuhito Katoh, Yokosuka; Hideyuki Nagashima, Yokohama; Yoichi Kishi, Yokosuka, all of Japan

[73] Assignee: Nissan Motor Co., Ltd., Kanagawa, Japan

[21] Appl. No.: 798,333

[22] Filed: Nov. 6, 1991

[30] Foreign Application Priority Data
Nov. 29, 1990 [JP] Japan .................. 2-325954

[51] Int. Cl.⁵ .................................. A47C 3/00
[52] U.S. Cl. .................. 297/284.6; 297/DIG. 3; 297/284.9
[58] Field of Search ........... 297/284.6, 284.1, DIG. 3, 297/284.4, 284.9

[56] References Cited

U.S. PATENT DOCUMENTS

| | | | |
|---|---|---|---|
| 4,634,179 | 1/1987 | Hashimoto et al. | 297/284.6 |
| 4,655,505 | 4/1987 | Kashiwamura et al. | 297/284.6 |
| 4,833,614 | 5/1989 | Saitoh et al. | 297/284.6 X |
| 5,127,708 | 7/1992 | Kishi et al. | 297/284.6 X |
| 5,129,704 | 7/1992 | Kishi et al. | 297/284.6 X |
| 5,155,685 | 10/1992 | Kishi et al. | 364/424.05 |

FOREIGN PATENT DOCUMENTS
61-257333 11/1986 Japan .

*Primary Examiner*—Kenneth J. Dorner
*Assistant Examiner*—Milton Nelson, Jr.
*Attorney, Agent, or Firm*—Pennie & Edmonds

[57] ABSTRACT

A seat apparatus for a vehicle includes a seat which is composed of a seat cushion and a seat back. A plurality of actuators are provided in the seat, for altering a bearing-surface configuration of the seat. The actuators are driven by an air compressor which is controlled by a controller in a predetermined pattern. The controller judges oscillation transmitted to a passenger seated on the seat, on the basis of a signal from an acceleration sensor, and regulates the predetermined pattern of the control, in accordance with the judged oscillation. The controller may be so arranged as to judge the oscillation transmitted to the passenger, on the basis of signals from a speed sensor and a road-surface-condition detecting sensor.

5 Claims, 9 Drawing Sheets

FIG.4
TABLE: RESONANCE OF EACH PART OF HUMAN BODY (IN CASE OF BEING SEATED)
| PART | DIRECTION | RESONANCE FREQUENCY (Hz) |
|---|---|---|
| TRUNK | VERTICAL | 3~6 |
| CHEST | VERTICAL | 4~6 |
| BACK COLUMN | VERTICAL | 3~5 |
| SHOULDER | VERTICAL | 2~6 |
| HEAD PART | VERTICAL | 5~8 |
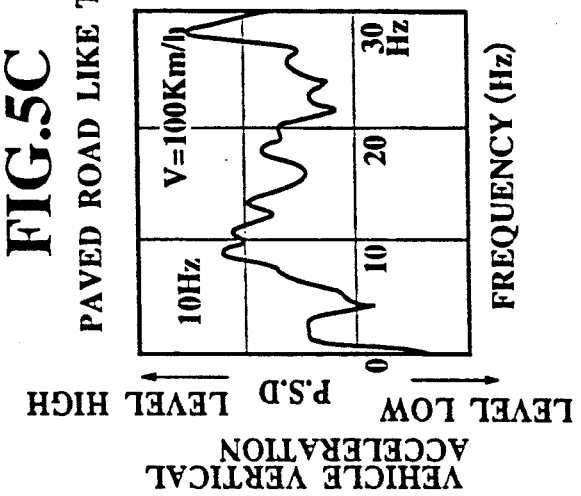
FIG.5C PAVED ROAD LIKE THRUWAY
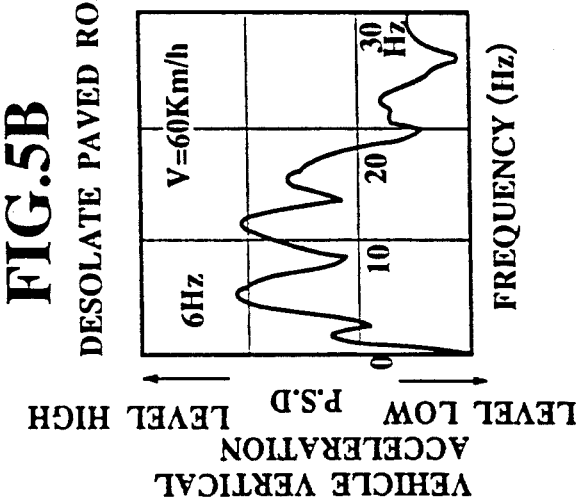
FIG.5B DESOLATE PAVED ROAD
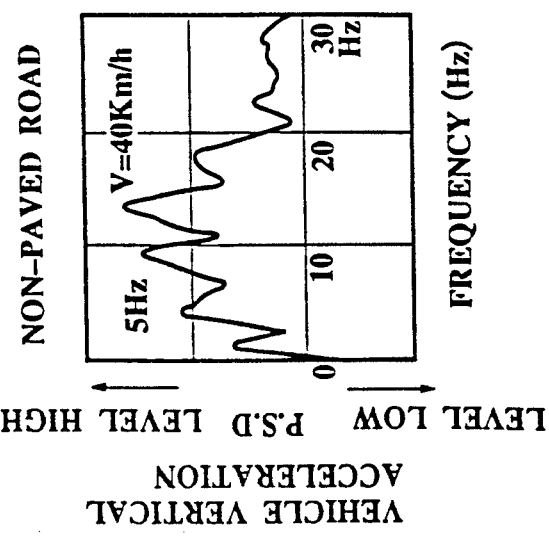
FIG.5A NON-PAVED ROAD

FIG.6A
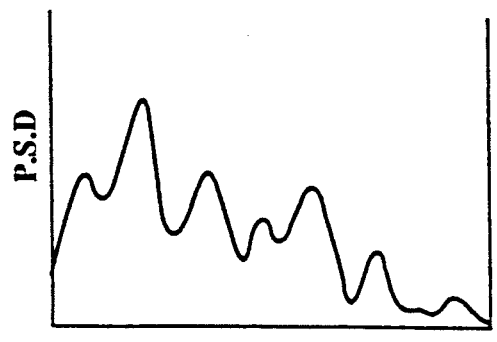
LOW ← FREQUENCY → HIGH
INPUT OSCILLATION (P,S,D)
FIG.6B
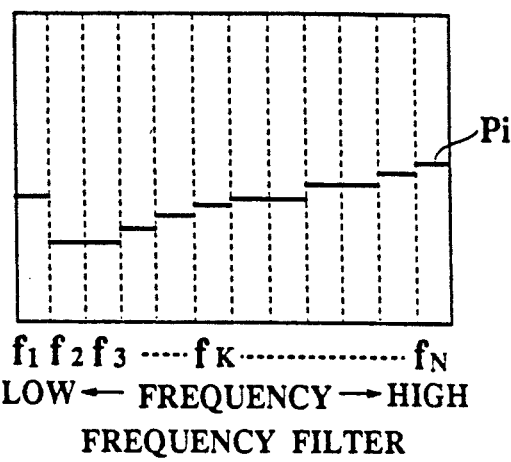
$f_1\, f_2\, f_3 \cdots f_K \cdots f_N$
LOW ← FREQUENCY → HIGH
FREQUENCY FILTER
FIG.6C
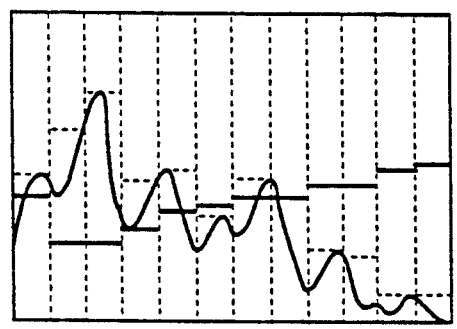
$f_1\, f_2\, f_3 \cdots f_K \cdots f_N$
FIG.6D
| i | 1 | 2 | 3 | ⋯ | K | ⋯ | N |
|---|---|---|---|---|---|---|---|
| COUNTER F(i) ADDED NUMERAL | 1 | 1 | 1 | ⋯ | 0 | ⋯ | 0 |

| FREQUENCY BAND | ACTUATOR OPERATING WAVEFORM | | | | | CYCLE (T) | | |
|---|---|---|---|---|---|---|---|---|
| | W1 | W2 | W3 | W4 | W5 | T1 | T2 | T3 |
| $f_1$ | | | ○ | | | ○ | | |
| $f_2$ | | ○ | | | | | ○ | |
| $f_3$ | | | ○ | | | | ○ | |
| $f_K$ | | | | | ○ | | | ○ |
| $f_N$ | ○ | | | | | | | ○ |

# SEAT APPARATUS FOR VEHICLE

BACKGROUND OF THE INVENTION

This invention relates to a seat apparatus for a vehicle, capable of variably controlling a bearing-surface configuration of a seat.

As a conventional seat apparatus for a vehicle of this kind, there is one disclosed in, for example, Japanese Patent Laid-Open No. SHO 61-257333. In the conventional seat apparatus, a seat is composed of a seat cushion and a seat back. In the seat, a front air mat, a center air mat, a pair of cushion-side air mats, and a pair of back-side air mats are arranged respectively within support sections such as a front support section, a center support section, a pair of side support sections and the like. The arrangement is such that expansion and contraction of each air mat alters a bearing-surface configuration of the seat. In the case where the vehicle operates for a long period of time, each of the air mats is controlled at a constant or predetermined cycle by a timer to alter the configuration of the bearing surface of the seat, so that variation is given to a posture of a passenger together with a lapse of time from the side of the seat, whereby an attempt is made to reduce fatigue.

By the way, various oscillations or vibrations transmitted to a vehicle body are inputted to a passenger seated on the seat, in accordance with running conditions and the like, so that the oscillations generate fatigue in various parts of a human body. Generally, in oscillation of low frequency, motion of the human body is attempted to be restrained to tense muscles, so that each part of the human body is tired or fatigued. In oscillation of high frequency, parts of the human body adjacent to contact surfaces between the seat and the parts of the human body are oscillated so that fatigue is accumulated. Further, oscillation of a certain frequency becomes one of the factors causing the fatigue, because a part of the human body is resonated. Furthermore, the larger the oscillation, the larger the fatigue.

In the conventional seat for the vehicle constructed as described above, however, each of the air mats 105 through 115 is merely controlled cyclicly at constant times set in a timer. Fatigue induced by oscillation transmitted to the passenger is not totally considered. Thus, there is a limit in reduction of the fatigue.

SUMMARY OF THE INVENTION

It is an object of the invention to provide a seat apparatus for a vehicle, in which oscillation transmitted to a passenger is considered and controlled whereby fatigue reducing effects can further be enlarged.

These and other objects can be achieved according to the present invention by providing a seat apparatus for a vehicle, comprising, as shown in FIG. 1:

a seat S having a seat cushion 1 and a seat back 3;

a plurality of actuators CL1 for altering a bearing-surface configuration of the seat, provided in the seat S;

means CL2 for driving the actuator CL1;

means CL3 for controlling the drive means CL2 in a predetermined pattern;

means for judging oscillation transmitted to a passenger seated on the seat S; and means CL5 for regulating the predetermined pattern of the control, in accordance with the oscillation judged by the oscillation judging means.

In a preferred embodiment, the seat apparatus for the vehicle further comprises an acceleration sensor for measuring the oscillation transmitted to the passenger. The oscillation judging means is so arranged as to judge the oscillation on the basis of a detecting value of the acceleration sensor. Further, the seat apparatus for the vehicle may further comprises a speed sensor for detecting a speed of the vehicle, and a road-surface-condition detecting sensor for detecting conditions of a road surface. The oscillation judging means is so arranged as to judge the oscillation on the basis of detecting values of the speed sensor and the road-surface-condition detecting means.

BRIEF DESCRIPTION OF THE DRAWINGS

FIG. 4 is a view for explanation showing resonance of each part of a human body (in the case of being seated);

FIGS. 5A, 5B and 5C are views for explanation showing examples of a difference in inputted oscillation due to running conditions;

FIGS. 6A, 6B, 6C and 6D are views for explanation showing a principle of judgment on a strength of frequency components;

DESCRIPTION OF THE EMBODIMENTS

Figure 1:
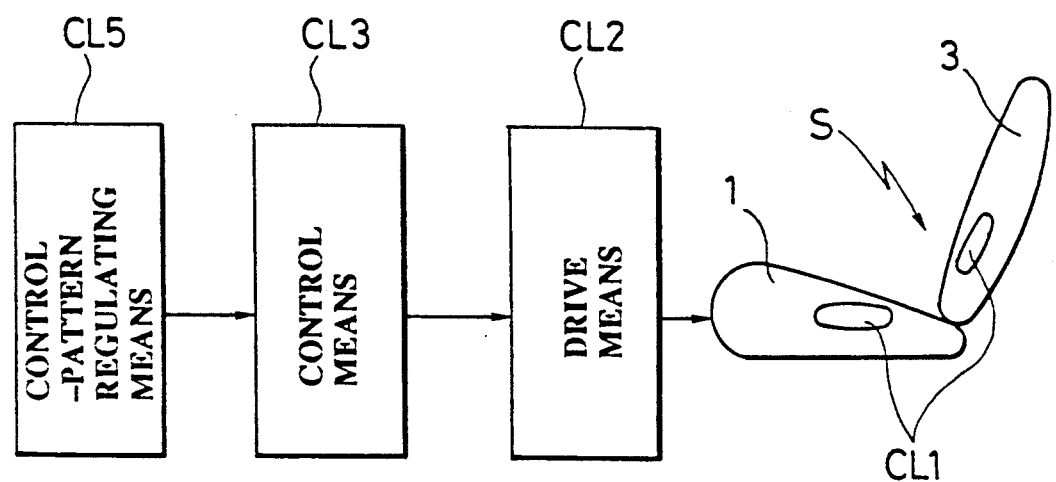
FIG. 1 is an arrangement view of a seat apparatus for a vehicle, according to the invention.
Figure 2:
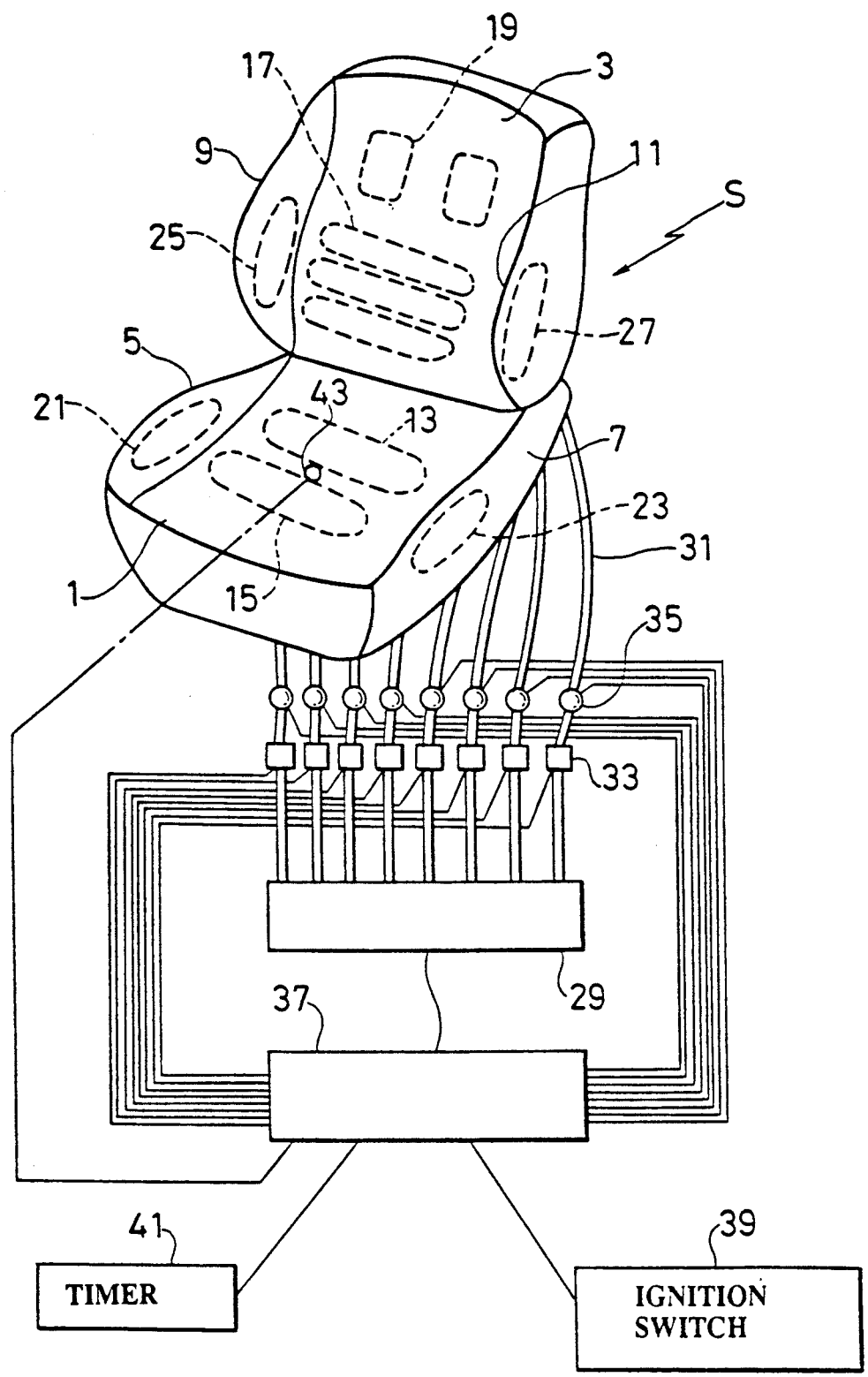
FIG. 2 is an arrangement view of a seat apparatus for a vehicle, according to an embodiment of the invention.

Referring first to FIG. 2, there is shown a seat S for a vehicle which is composed of a seat cushion 1 and a seat back 3. A pair of cushion-side support sections 5 and 7 are arranged respectively at both sides of the seat cushion 1, while a pair of back-side support sections 9 and 11 are arranged respectively at both sides of the seat back 3.

A hip-support air mat 13 and a thigh-support air mat 15 are arranged within the seat cushion 1 as actuators CL1, for supporting a hip region and a thigh region of one who is seated, respectively, that is a passenger. A plurality of lumber-support air mats 17 and a pair of back-support air mats 19 are arranged within the seat back 3 as actuators CL1, for supporting a lumber region and a pair of upper limb regions of the one who is seated. A pair of cushion-side support air mats 21 and 23, which support side sections of respective lower limbs of the one who is seated, are arranged respectively in the cushion-side support sections 5 and 7 as actuators CL1. Furthermore, a pair of back-side support air mats 25 and 27, which support side sections of the upper limbs of the one who is seated, are arranged within the pair of back-side support sections 9 and 11, respectively, as actuators CL1. By expansion and contraction of these air mats 13~27, the bearing surface of the seat S is deformed at their respective locations.

The air mats 13~27 are connected respectively to lines 31 which branch off from a discharge port of an air compressor (or a pump) 29. Electromagnetic valves 33 and pressure sensors 35 are provided in the lines 31, respectively. The compressor 29 and the electromagnetic valves 33 cooperate with each other to form drive means CL2.

The compressor 29, the electromagnetic valves 33 and the pressure sensors 35 are connected to a controller 37 which is composed of a microcomputer, as control means CL3.

Moreover, in this embodiment, the controller 37 includes also oscillation judging means CL4 for judging oscillation transmitted to the passenger seated on the seat S, and control-pattern regulating means CL5 for regulating a predetermined pattern of control in accordance with the judged oscillation.

Further, an ignition switch 39, a timer 41 and an acceleration sensor 43 are connected to the controller 37.

In this embodiment, the acceleration sensor 43 is arranged within the seat cushion 1, to measure oscillation transmitted from the vehicle body to the one who is seated, that is the passenger. The controller 37 directly judges the oscillation on the basis of an oscillation detecting value of the acceleration sensor 43. In this connection, an arrangement position of the acceleration sensor 43 is not limited to the seat cushion 1, but may be one where the oscillation transmitted to the passenger can accurately be measured.

The compressor 29 is driven by a drive signal from the controller 37. Air pressures in the respective air mats 13~27 are detected by the pressure sensors 35, respectively. On the basis of detecting values of the respective pressure sensors 35, the electromagnetic valves 33 are controlled in opening and closing, to expand and contract the air mats 13~27 so that the bearing-surface configuration of the seat S is deformed in a predetermined pattern, thereby reducing fatigue of the one who is seated.

Figure 3:
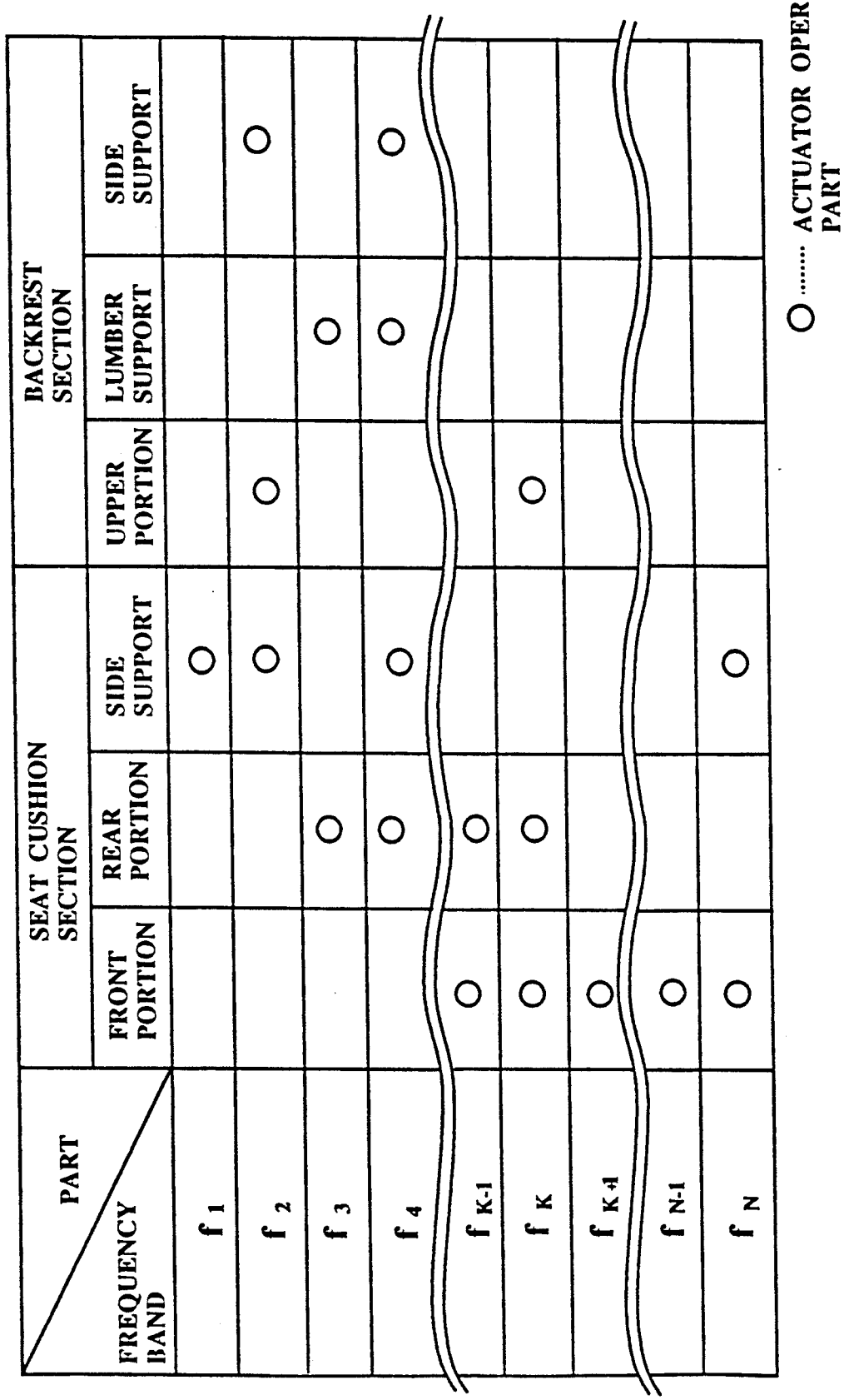
FIG. 3 is a view for explanation showing an example of a variable drive chart for a bearing-surface configuration.

FIG. 3 is a view for explanation showing an example of a variable drive chart for the bearing-surface configuration, in the above-described embodiment.

The variable drive charts for the bearing-surface configuration, illustrated in FIG. 3 are arranged such that frequency components of the oscillation inputted to the passenger are investigated, various parts of the human body, which are caused fatigue by the frequency components with respect to strong components, are selected, and the air mats corresponding respectively to the parts of the human body are controlled in driving. In FIG. 3, the marks ◯ indicate the drive parts with respect to the strong frequency components. An example is as follows. That is, when a frequency band $f_1$ is strong, the side supports 21 and 23 of the seat cushion 5 are driven in a predetermined pattern.

Specifically, the human body forms a spring-mass-damper oscillation system by skeletons, muscles or the like of the human body, and various parts of the human body have resonance frequencies as illustrated in FIG. 4. In the case where the parts of the human body are resonated, since a human being tenses surrounding muscles in an attempt to suppress the resonance, fatigue due to the oscillation occurs. For example, in the case where the part of the human body resonated is a trunk (resonance frequency being 3~6 Hz), an abdominal muscle and a back muscle are tensed, while, in the case of the head region (resonance frequency being 5~8 Hz), muscles of a neck and a shoulder are tensed. Thus, fatigue occurs. On the other hand, in the case of an automobile, as shown in FIGS. 5A, 5B and 5C, levels of the oscillation and frequency components, which are transmitted to the human body, are largely different from each other, depending upon running conditions such as a running road surface, a running speed and the like. Accordingly, in the case of a non-paved road illustrated in FIG. 5A, assuming that the automobile runs at 40 Km/h, then a power spectrum at the frequency of 5 Hz is high so that the trunk and a chest tend to be tired. In the case of a desolate paved road illustrated in FIG. 5B, assuming that the automobile runs at 60 Km/h, then a power spectrum at the frequency of 6 Hz is high so that the human body tends to be tired centering around the head region. In the case of a paved road like a thruway illustrated in FIG. 5C, assuming that the automobile runs at 100 Km/h, then a power spectrum at the frequency of 10 Hz increases or becomes high. In this manner, since degrees of the fatigue and the parts of the human body of the passenger due to the oscillation are different from each other depending upon the running conditions, it is effective to variably control the bearing-surface configuration depending upon the inputted oscillation in order to reduce the fatigue of the passenger.

FIGS. 6A, 6B, 6C, 6D show a principle of oscillation judgment, that is, a judgment principle of a strength of the frequency components.

Specifically, a frequency filter as illustrated in FIG. 6B is applied to inputted oscillation to a passenger as illustrated in FIG. 6A by means of frequency bands of numbers N as illustrated in FIG. 6C. A frequency higher than a predetermined prescribed level Pi is once counted by a counter. The counted numbers F(i) are found (FIG. 6D), to judge the oscillation.

At this time, if the frequency filter is arranged such that the prescribed level Pi is lower and the more components thereof tend to tire the passenger, detection of the fatigue with a higher accuracy is made possible. For example, in FIG. 6B, prescribed levels $P_2$ and $P_3$ of respective frequencies $f_2$ and $f_3$ are the lowest.

Figure 7:
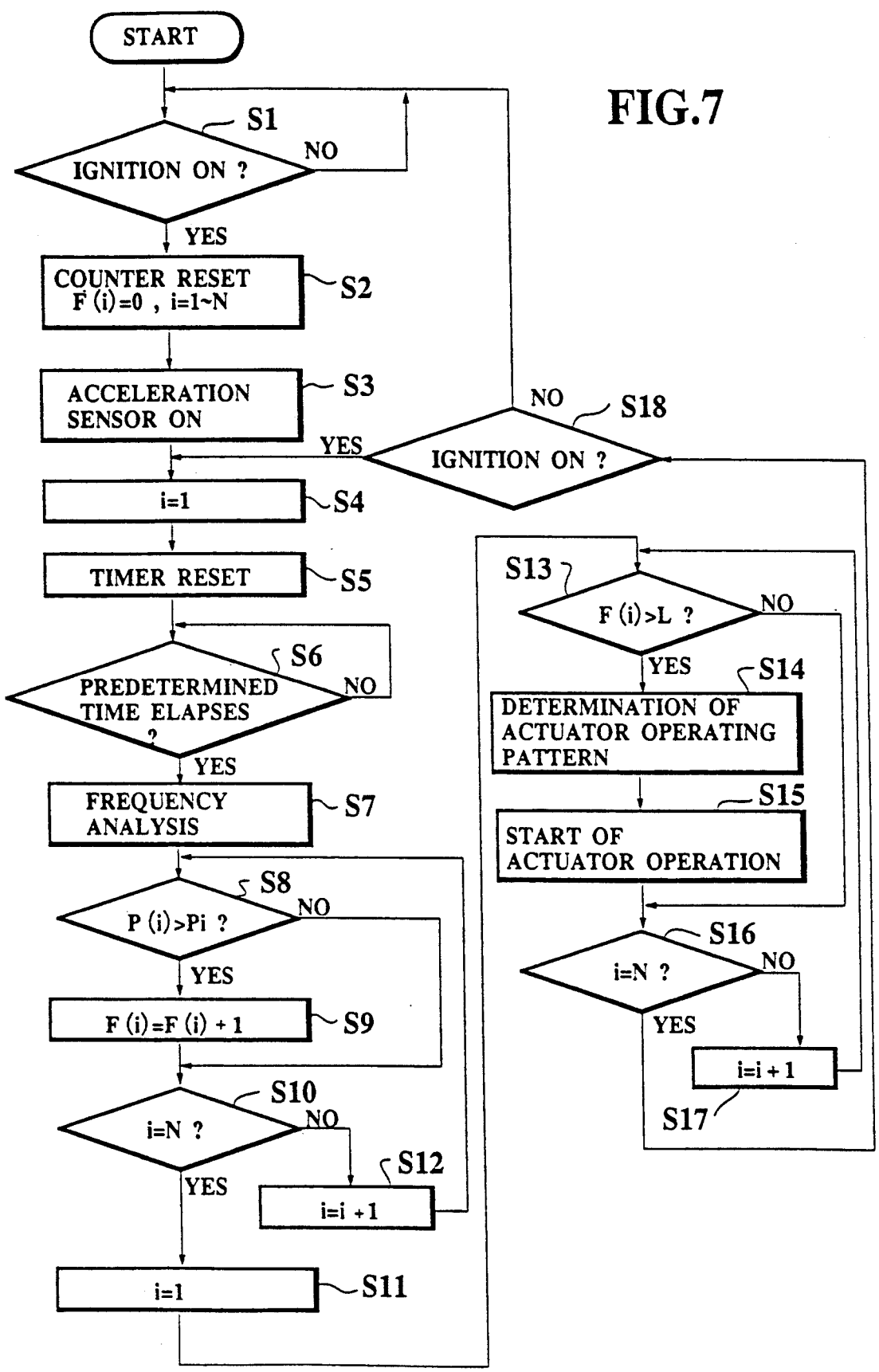
FIG. 7 is a control flow chart on the basis of the arrangement illustrated in FIG. 2.

Operation of the above-described embodiment will next be described with reference to a flow chart shown in FIG. 7.

The flow chart starts when an ON signal from the ignition switch 39 is inputted to the controller 37, and is repeated every predetermined time.

When a driver is seated to turn on the ignition switch 39 (step S1), the counter is reset, and the acceleration sensor 43 is turned on so that the timer 41 is reset (steps S2~S5).

Subsequently, in a step S6, a measuring value of the section of the seat cushion 1 measured by the acceleration sensor 43 is fetched to the controller 37 every predetermined time. A measuring value inputted in a step S7 (FIG. 6A) is analyzed in frequency by FET or the like, to find a power spectrum density (PSD), thereby finding an oscillation strength of predetermined N frequency bands.

In a step S8, it is judged whether or not the oscillation strength of the frequency bands is higher than the predetermined strength level Pi (FIG. 6C). When the oscillation strength is higher than the set strength level Pi, one time is counted by the counter (step S9, FIG. 6D). Further, when the strength of frequency bands is lower than the set strength level Pi, no counting is made, and a program proceeds to a step S10.

In the step S10, it is judged whether or not counting is made with respect to the N frequency bands. When the counting regarding the N frequency bands is completed, the program proceeds to a step S13 where it is judged whether or not the respective counting numbers F(i) exceed predetermined reference times L. Here, the respective counting numbers F(i) exceed the predetermined reference times L, it is judged that fatigue due to oscillation is present. Drive parts of the air mats are determined in accordance with the variable chart of the bearing-surface configuration, to output a drive signal (step S14). By the drive signal, a corresponding one of the air mats is driven so that the bearing-surface configuration is altered (step S15). Subsequently, in a step S16, it is judged whether or not processing is made to all the N frequency bands. If the processing is on the way, the processing is counted up in a step S17 so that the program is repeated from the step S13. If the processing is completed, the program proceeds to a step S18 where it is judged whether or not the ignition switch 39 is turned on. When the ignition switch 39 is turned on, this indicates that the vehicle is under being run, or under stopping temporarily so that the vehicle again continues to be run. Accordingly, the program proceeds to the step S4 where the counter is reset to continue controlling. Furthermore, when the ignition switch 39 is turned off in the step S18, the controlling is completed.

Accordingly, at the time the bearing-surface configuration is altered, it is possible to select and vary the variable parts of the bearing-surface configuration in accordance with oscillation inputted to the passenger, making it possible to further improve fatigue reducing effects in accordance with the running conditions of the vehicle. Moreover, it is possible to estimate fatigue of the passenger due to the oscillation. By driving the air mats at a stage before the passenger feels fatigue, it is also possible to reduce the fatigue at an early stage.

Figure 8:
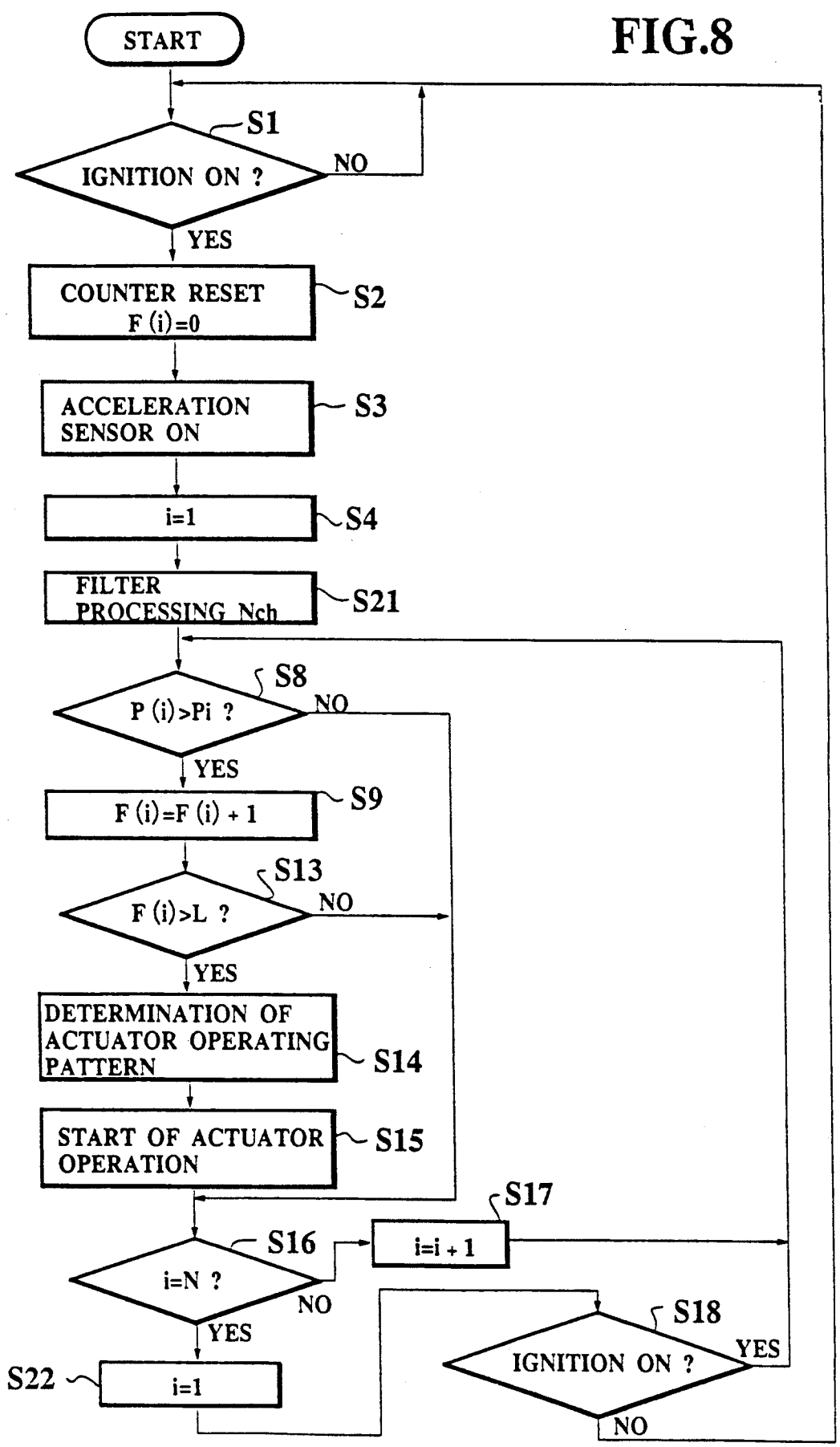
FIG. 8 is a control flow chart according to another embodiment of the invention.

FIG. 8 shows a flow chart according to another embodiment of the invention. The same or identical reference characters are applied to steps similar to those illustrated in FIG. 7, and the duplicate description will be omitted.

The embodiment is arranged such that, as means for detecting oscillation transmitted to the passenger, a band filter is applied to the signal from the acceleration sensor 43 (step S21), one time is counted by the counter when an output from the band filter is higher than the prescribed level Pi, and the counting numbers F(i) are compared with the reference times L (steps S8~S9 and S13).

In this embodiment, since the oscillation is observed in a time series, it is ensured to detect shock oscillation like, for example, a joint of a road. Thus, it is possible to detect the fatigue with a higher accuracy, making it possible to magnify the fatigue reducing effects.

Figures 9A, 9B:
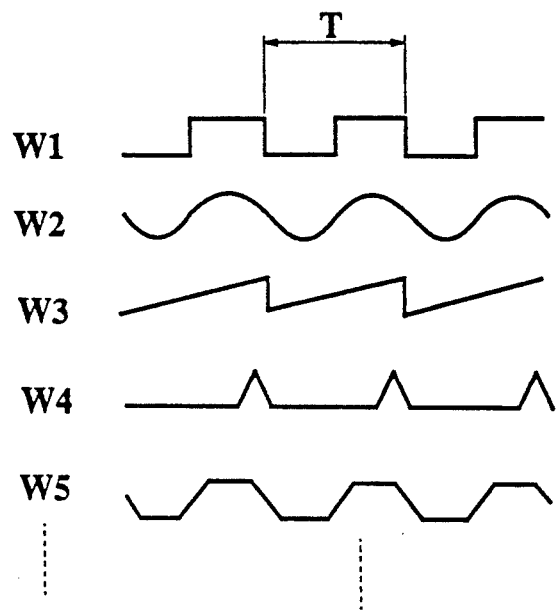
FIGS. 9A and 9B are views for explanation showing an example of a drive pattern of an actuator.

FIGS. 9A and 9B show an example which controls drive waveforms and cycles thereof of the air mat.

FIG. 9A shows an example of the drive waveforms of the air mats, which are so arranged as to be capable of being variably driven by a plurality of drive waveforms $W_1 \sim W_n$ different from each other. As illustrated in FIG. 9B, a waveform capable of more effectively reducing fatigue due to oscillation with respect to frequency components of the oscillation inputted to the passenger is selected from the drive waveforms illustrated in FIG. 9A. Further, a cycle T of the selected waveform is set to drivingly control the air mats. In FIG. 9B, the marks ○ indicate the selected drive waveforms. Accordingly, in the embodiment, driving locations are not altered depending upon the oscillation, but all the air mats can be driven at the same waveform so that a feeling of physical disorder of the passenger is reduced. In this connection, arrangement may be such that, like the embodiment described previously, the drive locations are selected, and the waveforms are further selected.

Figure 10:
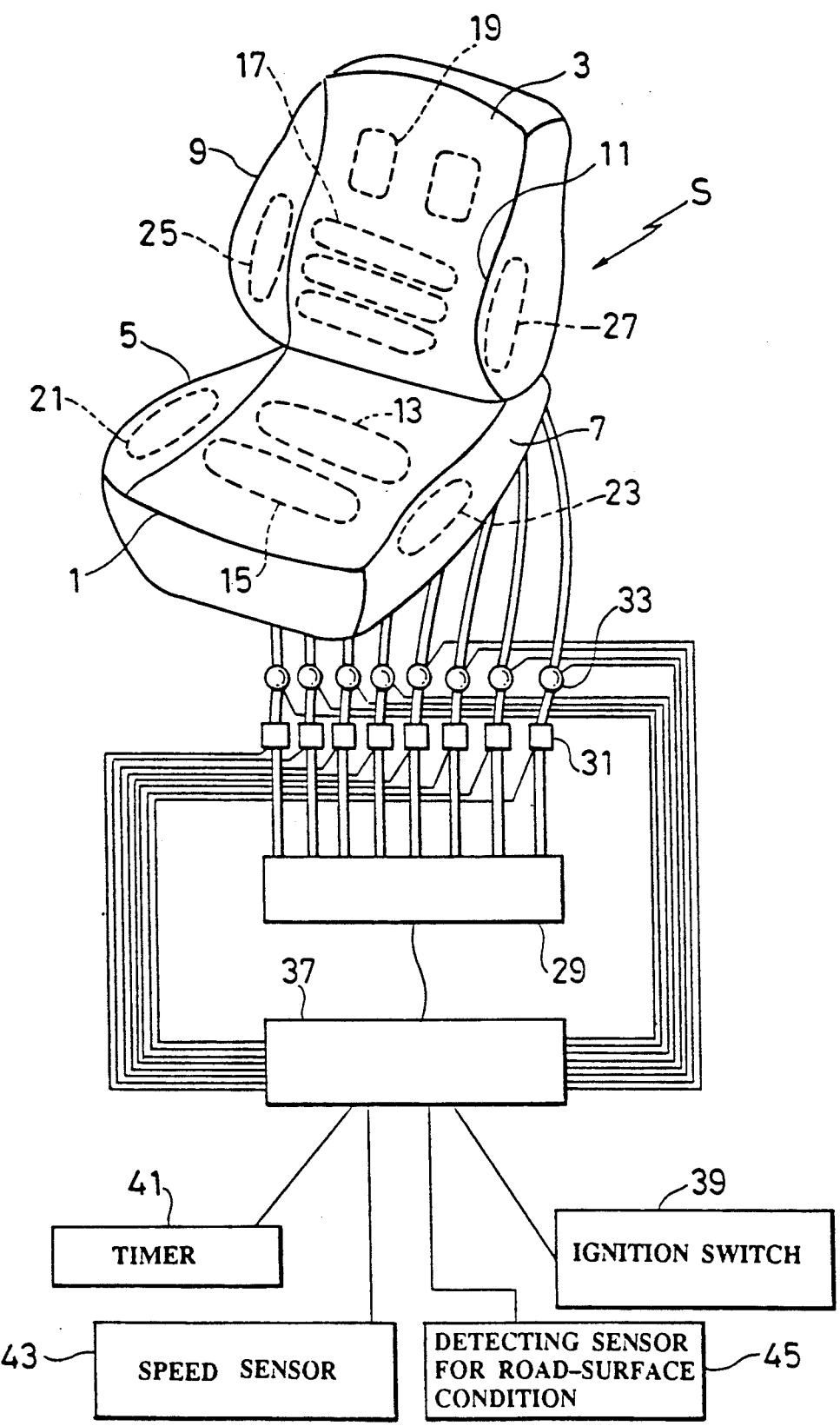
FIG. 10 is an arrangement view of a seat apparatus for a vehicle, according to still another embodiment of the invention.

FIG. 10 shows still another embodiment of the invention which is arranged such that oscillation transmitted to a passenger is judged in view of running conditions of a vehicle. That is, the embodiment comprises a speed sensor 43 and a road-surface-condition detecting sensor 45 which are connected to the controller 37. The speed sensor 43 fetches a signal from, for example, a speed meter, while the road-surface-condition detecting sensor 45 is composed of, for example, a transmitter which transmits or sends an ultrasonic wave to a road surface and a receiver which receives the ultrasonic wave therefrom. Relationship graphs between oscillation levels and the frequency components like those illustrated in FIGS. 5A~5C are variously inputted beforehand by experiments or the like, in view of the relationship between the road-surface conditions and the speed of the vehicle, and relationship graphs between the oscillation levels and the frequency components, corresponding to the running conditions judged by the controller 37, are outputted, to execute controlling similar to that described above.

Accordingly, in this embodiment, the oscillation transmitted to the passenger is detected indirectly so that controlling in accordance with the running conditions is made possible.

What is claimed is:

1. A seat apparatus for a vehicle, comprising:
    a seat having a seat cushion and a seat back;
    at least one actuator for altering a bearing surface configuration of said seat situated within said seat cushion and said seat back;
    driving means for driving said actuator;
    vibration sensor means within the vehicle for measuring vibration transmitted to an occupant, which outputs a measured value of the vibration;
    judging means having a frequency filter means for filtering at least one frequency band connected to said sensor means to count the number of vibrations exceeding a predetermined level of strength or amplitude prescribed for said at least one frequency band;
    regulating means for regulating a predetermined pattern to control said drive means, in accordance with said number of vibrations transmitted to the occupant, said predetermined pattern being previously determined with investigating frequency components of the vibration which are apt to fatigue the occupant and parts of the human body with said frequency components; and
    controlling means for controlling said drive means in said predetermined pattern regulated by said regulating means.

2. A seat apparatus according to claim 1, wherein said frequency filter lowers the predetermined level of frequency when the frequency components which tend to tire the passenger is greater.

3. A seat apparatus according to claim 1, wherein said vibration sensor means is situated within said seat cushion.

4. A seat apparatus for a vehicle, comprising:

a seat having a seat cushion and a seat back;

a plurality of actuators for altering a bearing surface configuration of said seat situated within said seat cushion and said seat back;

driving means for driving said actuators;

an acceleration sensor means within the vehicle for measuring vibration transmitted to an occupant, which outputs a measured value of the vibration;

judging means having a frequency filter means for filtering a plurality of frequency bands connected to said sensor means to count, in each of said frequency bands, the number of vibrations exceeding a predetermined level of strength or amplitude prescribed for each frequency band;

regulating means for regulating a predetermined pattern to control said drive means, in accordance with said number of vibrations transmitted to the occupant, said predetermined pattern being previously determined with investigating frequency components of the vibration which are apt to fatigue the occupant and parts of the human body with said frequency components; and controlling means for controlling said drive means in said predetermined pattern regulated by said regulating means.

5. A seat apparatus according to claim 4, wherein said acceleration sensor means is situated within said seat cushion.

* * * * *